(12) United States Patent
Dolezal et al.

(10) Patent No.: US 6,567,211 B1
(45) Date of Patent: May 20, 2003

(54) DUAL-BAND MILLIMETER-WAVE AND INFRARED ANTI-REFLECTING COATINGS

(75) Inventors: Franklin A. Dolezal, Reseda, CA (US); Robin J. Harvey, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/612,735

(22) Filed: Jul. 10, 2000

(51) Int. Cl.[7] ............................ G02B 5/08; G02B 13/14; G02B 1/10
(52) U.S. Cl. ................. 359/359; 359/350; 359/356; 359/586; 359/589
(58) Field of Search ................................ 359/350, 359, 359/589, 585, 586, 356; 250/208.1; 252/582, 587

(56) References Cited

U.S. PATENT DOCUMENTS

| 4,765,722 A | 8/1988 | Aono | |
|---|---|---|---|
| 4,790,637 A | 12/1988 | Mercado | |
| 4,997,241 A | 3/1991 | Muratomi | |
| 5,007,689 A | 4/1991 | Kelly | |
| 5,072,109 A | 12/1991 | Aguilera | 250/226 |
| 5,204,782 A | 4/1993 | Mercado | 359/786 |
| 5,262,633 A | 11/1993 | Kasai | 250/208 |
| 5,532,871 A | 7/1996 | Hashimoto | 359/359 |
| 5,694,240 A | 12/1997 | Sternbergh | 359/359 |
| 5,776,612 A * | 7/1998 | Fisher | 359/585 |
| 5,894,366 A | 4/1999 | Ferrante | 359/581 |
| 5,914,822 A | 6/1999 | Maruyama | 359/743 |

* cited by examiner

*Primary Examiner*—Audrey Chang
(74) *Attorney, Agent, or Firm*—Tope-McKay & Associates

(57) ABSTRACT

Dual band millimeter-wave and infrared anti-reflecting coatings are presented, which enhance the passage of millimeter-wave and infrared radiation into a substrate material. A substrate is coated with a quarter-wave coating of an infrared anti-reflecting material followed by a quarter-wave coating of a millimeter-wave anti-reflecting material followed by a second quarter-wave coating of an infrared anti-reflecting material. The second infrared anti-reflecting coating enables incident infrared radiation to pass into the millimeter-wave anti-reflecting material, while minimizing reflection. The first infrared anti-reflecting coating enables incident infrared radiation from the millimeter-wave anti-reflecting material to pass into the substrate material, while minimizing reflection. The millimeter-wave anti-reflecting coating enables incident millimeter-wave radiation to pass into the substrate material, while minimizing reflection. All of the materials used are chosen to be millimeter-wave and infrared radiation permeable. Because the wavelength size ratio of millimeter-wave radiation to infrared radiation is on the order of 1000:1, the millimeter-wave anti-reflecting coating does not interfere, to the first order, with the transmission of infrared radiation, and the infrared anti-reflecting coating does not interfere with the transmission of millimeter-wave radiation.

15 Claims, 4 Drawing Sheets

Note that the thicknesses of 102 (a) and 104 (c) are roughly 1/1000 the thickness of 106 (b).

Note that the thicknesses of 102 (a) and 104 (c) are roughly 1/1000 the thickness of 106 (b).

| Index of Refraction | 1.6 | 1.2 | 1.9 | 1.7 |
|---|---|---|---|---|
| Dielectric Constant | 2.4 | 1.5 | 3.7 | 2.7 |
| Suitable Materials Would Include | polystyrene cross-linked with divinylbenzene | MgF$_2$, BaF$_2$ And selected other group II fluoride salts | thermoset ceramic loaded plastic | Poly vinyl chloride |
| | poly-4 methyl pentene-1 | ThF$_2$ | Commercially available Schott glass | Certain optical quality Polystyrenes |
| | Commercially available Schott glass | Commercially available Schott glass | | Commercially available Schott glass |

FIG. 4

DUAL-BAND MILLIMETER-WAVE AND INFRARED ANTI-REFLECTING COATINGS

GOVERNMENT RIGHTS

At least a portion of the work related to the invention described herein was performed under government contract, specifically contract DAAB 07-97-2-J035. All rights possessed by the U.S. Government in this subject matter are governed by the terms of that contract.

TECHNICAL FIELD

The present invention relates to dual waveband optical systems, and more particularly to anti-reflecting coatings with simultaneous utility in both the millimeter-wave and infrared bands.

BACKGROUND OF THE INVENTION

Anti-reflective coatings utilize the principle of destructive interference to reduce the reflectance from a surface. Differences in the index of refraction of a first and a second media, for example air and glass, through which radiation passes result in a discontinuous index of refraction, causing a certain amount of the impinging radiation to be reflected. By placing a coating of the appropriate thickness and index of refraction between the air and glass, it is possible to create destructive interference to eliminate undesirable reflection. Specifically, the use of a thickness equal to ¼ of the wavelength at the center of the region for which antireflectance is desired results in a ½ wavelength phase difference for the reflected radiation. As a result, the radiation reflected at the coating-glass interface will be completely out of phase with the reflected wave at the air-coating interface. Both waves undergo a 180-degree phase change on reflection, and are out of phase because of the path difference. As a result, the reflected waves interfere destructively. Thus, if a lens is coated with a film having the right refractive index and a thickness of one-quarter wave, the reflection will be cancelled out and all of the incident radiation will enter (or leave) the lens.

Quarter-wave anti-reflecting coatings are commonly used in lens systems such as sunglasses, cameras, telescopes, automotive headlight systems, and binoculars. Both hard and soft lens coatings have been developed for use in these applications, varying in performance, cost, and lifetime. Anti-reflecting coatings utilized for these applications are generally designed to be effective over a single wave band. U.S. Pat. No. 5,894,366, which presents a means for improved automotive headlamp output, provides an example of a typical anti-reflecting coating comprising a substrate, a first layer, and a second layer, with the layers selected to optimize the passage of light in a particular wave-band from the headlamp and to give the light a particular tint.

Anti-reflection films have also been designed to be effective over closely neighboring portions of the ultraviolet and visible bands. U.S. Pat. No. 5,532,871, entitled "Two-Wavelength Antireflection Film" provides an example of an anti-reflection film capable of effective anti-reflection in two wavelength regions, for example, in an ultraviolet wavelength region of 200–300 nm and a visible wavelength region of 600–700 nm. It provides a substrate and a film consisting of alternately laminated layers of a low refractive index material and an intermediate refractive index material in order to form a light entrance side to the surface of the substrate. Another example of an anti-reflection film effective over two wave bands is provided in U.S. Pat. No. 4,997,241, entitled "Multi-Layered Antireflection Film Preventing Reflection At Two Wavelength Regions." This reference discloses a multi-layered antireflection film preventing reflection in an ultraviolet wavelength region of 200–300 nm and a visible wavelength region of 600–700 nm.

Although two wave band anti-reflection coatings have been developed for the closely neighboring ultraviolet and visible wavelength regions, the present invention is concerned with developing a two band anti-reflection coating system effective in the infrared and millimeter-wave bands, which can be utilized in conjunction with a focal plane array responsive to both infrared and millimeter-waves.

In the past, systems designed for imaging in the infrared and millimeter-wave bands required two somewhat independent imaging and detection schemes. In general, reflecting optics used in these imaging systems tend to be large in size and cumbersome to use. U.S. Pat. No. 5,751,473 provides an example of a dual-waveband optical system for use in the infrared waveband, which incorporates a series of optical components to perform the desired imaging operation. With the increased need for smaller imaging devices such as space-based imaging and aircraft/spacecraft landing aids, a need has arisen for a lens system which provides imaging in both the infrared and millimeter-wave bands, yet which does not require a large and cumbersome multiple lens system. This is especially important in space-based applications where payload weight is cost-critical. In order to develop such a system, it is also important to develop a lens coating system that provides anti-reflection in the infrared and millimeter-wave bands.

It is therefore an object of the present invention to provide a lens coating arrangement that provides effective antireflection in both the infrared and millimeter-wave bands, which generally have a wavelength ratio on the order of 1:1000.

SUMMARY OF THE PRESENT INVENTION

A dual-band millimeter-wave and infrared anti-reflecting coating is presented, including a first infrared anti-reflecting coating, with the first infrared anti-reflecting coating having an optical thickness of approximately ¼ of the wavelength of a particular wavelength chosen from the infrared band; a millimeter-wave anti-reflecting coating disposed upon the first infrared anti-reflecting coating, with the millimeter-wave anti-reflecting coating having an optical thickness of approximately ¼ of the wavelength of a particular wavelength chosen from the millimeter-wave band; and a second infrared anti-reflecting coating disposed upon the millimeter-wave anti-reflecting coating, with second infrared anti-reflecting coating having an optical thickness of approximately ¼ of the wavelength of a particular wavelength chosen from the infrared band, wherein the particular wavelength chosen from the infrared band is the same for both the first infrared anti-reflecting coating and the second infrared anti-reflecting coating. The thickness of the particular materials chosen may be adjusted depending on the wavelengths for which a particular embodiment is designed. In actual use, the coating is typically applied to a substrate such as a lens. Typical lens materials include Zinc Sulfide (ZnS), Zinc Selenide (ZnSe), and Aluminum (III) Oxide ($Al_2O_3$), though any applicable material may be used.

In the special case of coherent infrared light incident on the lens, it is possible that the second infrared coating may be eliminated, and the millimeter-wave anti-reflecting coating is made to have one quarter wavelength thickness in the millimeter band and $n/2+¼\lambda$ thickness in the infrared band where n represents the particular wavelength chosen from the infrared band.

These and other features and advantages of the present invention will be apparent to those skilled in the art from the following detailed description, taken together with the accompanying drawings, in which like reference materials refer to like parts.

BRIEF DESCRIPTION OF THE DRAWINGS

FIG. 4 presents a table displaying a non-limiting list of typical coating materials along with their index of refraction and dielectric constant.

DETAILED DESCRIPTION

Figure 1:
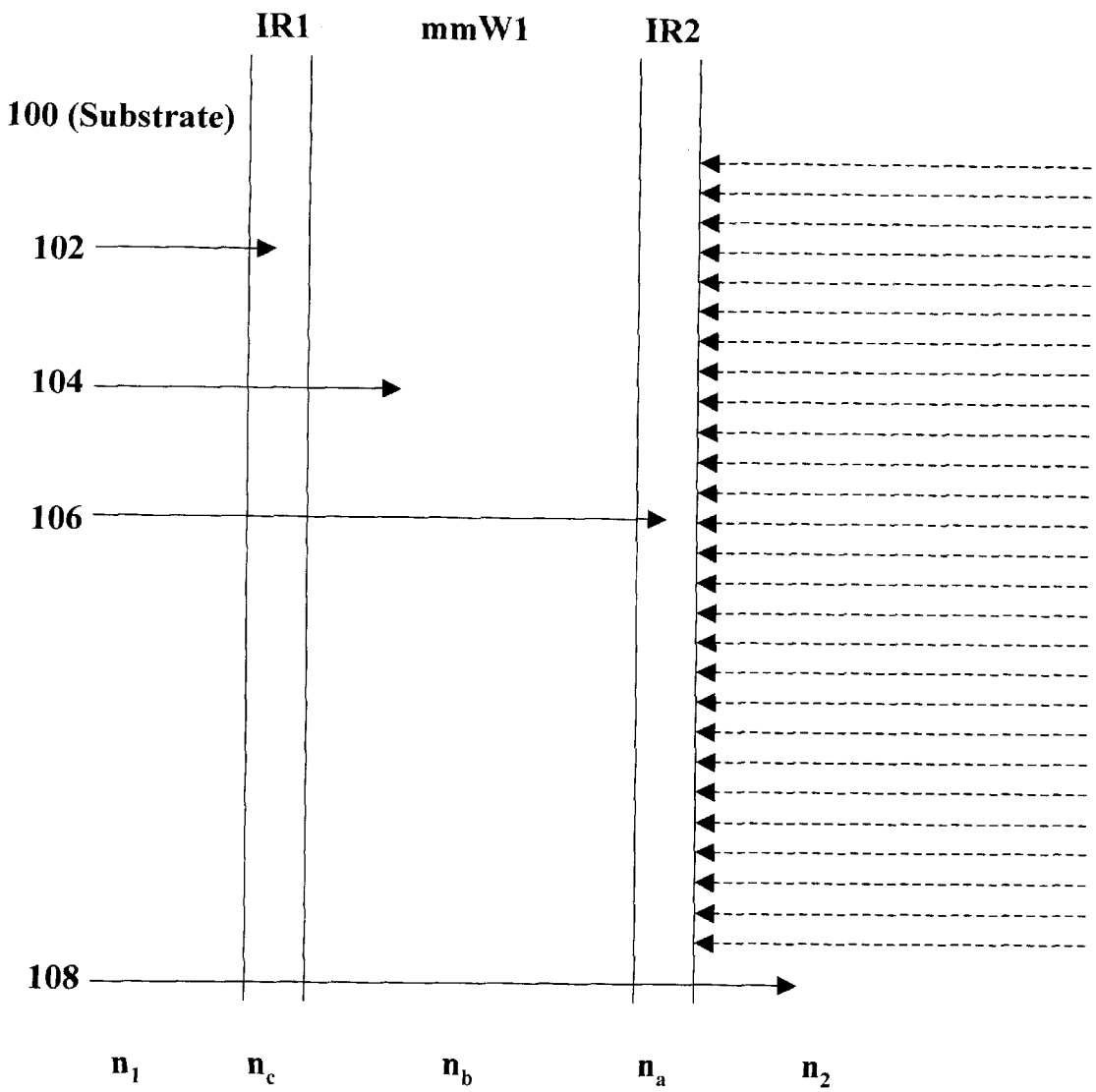
FIG. 1 presents a schematic view demonstrating the application of the dual band millimeter-wave and infrared coatings of the present invention to a flat substrate.

The present invention provides an anti-reflecting coating, simultaneously operative in both the millimeter-wave and infrared bands, and may be tailored to a variety of applications. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The dual-band millimeter-wave and infrared anti-reflecting coatings of the present invention provide means for simultaneously substantially reducing, or eliminating, reflective loss from lens surfaces in two bands, specifically the infrared and millimeter-wave bands. Devices configured to substantially reducing, or eliminating, reflective loss in these bands may be applied to various imaging or detection systems and may be useful in applications where dual waveband detection provides superior results, such as space-based imaging, aircraft landing aids, marine navigation aids and inclement weather imaging.

Single quarter-wave anti-reflecting coatings are effective across a single waveband that consists of radiation having a center optical wavelength around four times the thickness of the coatings modified by the index of refraction. Conventional coatings are configured to operate at a single wavelength, called the center wavelength, such coatings provide a optimal antireflective properties at the center wavelength, and have diminishing a level of effectiveness as the wavelengths become more disparate from the center wavelength. Thus, a single quarter-wave anti-reflecting coating may be effectively used for two or more wavelengths provided that both wavelengths are sufficiently close to the center wavelength. However, the ratio of wavelengths from millimeter-waves to infrared is of the order of 1000:1. Such a disparate divergence substantially obviates the utility of an antireflective coating at a center wavelength. Consequently, it is impractical to use one coating for both bands for incoherent radiation emitters. Even assuming the use of coherent radiation sources in both bands, variations in phase and angle would make the infrared performance of a thick millimeter-wave coating very problematic. Typical lens material utilized in both the infrared and millimeter-wave bands include ZnS, ZnSe, and $Al_2O_3$, all of which have high indexes of refraction, specifically about 2.4/3.0, 2.3/2.9, and 1.7/3.1 respectively in the infrared/millimeter-wave bands. The reflected loss at normal incidence is defined by the following equation $$reflected\ loss = \frac{(1-n)^2}{(1+n)^2},$$

where n is the index of refraction for the particular lens material in the band of interest (since n varies with wavelength).

Given the lens materials just mentioned, the above equation indicates that the reflected surface loss at normal incidence would be roughly 17% to 26%, depending on the particular material chosen. Also, this loss would vary with the angle of incidence required by a particular application.

The present invention provides a means for treating lens surface boundaries with a plurality of ¼ wavelength coatings wherein each coating is configured to be responsive to a unique waveband. Said coatings include at least one ¼ wavelength millimeter-wave coating, hereinafter the millimeter-wave coating and at least one ¼ wavelength IR coating, where in the first IR coating is disposed on the external surface of the millimeter-wave coating. The coating method provides a total coating thickness on the order of a ¼ millimeter, which additionally allows for a loss tangent in the coating which is at least an order of magnitude higher than that allowable for the lens materials, which, in turn, allows for the coating materials to be selected from a wider range of materials than the lens system.

A schematic view of an embodiment demonstrating the application of the dual band coating system of the present invention to a flat substrate is shown in FIG. 1. As illustrated, a radiation-receiving surface 100 having an index of refraction $n_1$ is coated with a first, ¼ wavelength infrared anti-reflecting layer, 102 having an index of refraction $n_c$, which is, in turn coated with a ¼ millimeter-wave anti-reflecting layer 104 having an index of refraction $n_b$, which is, in turn coated with a second infrared anti-reflecting layer 106 having an index of refraction $n_a$. The external medium 108 opposite the radiation-receiving surface 100 has an index of refraction of $n_2$. Note that radiation is shown as entering the radiation-receiving surface 100 or substrate from the external medium 108 through the coating layers 102, 104, and 106 as an example only, the invention also finds application in reducing internal reflectance and may be used on either or both sides of a radiation passing medium.

Figure 2:
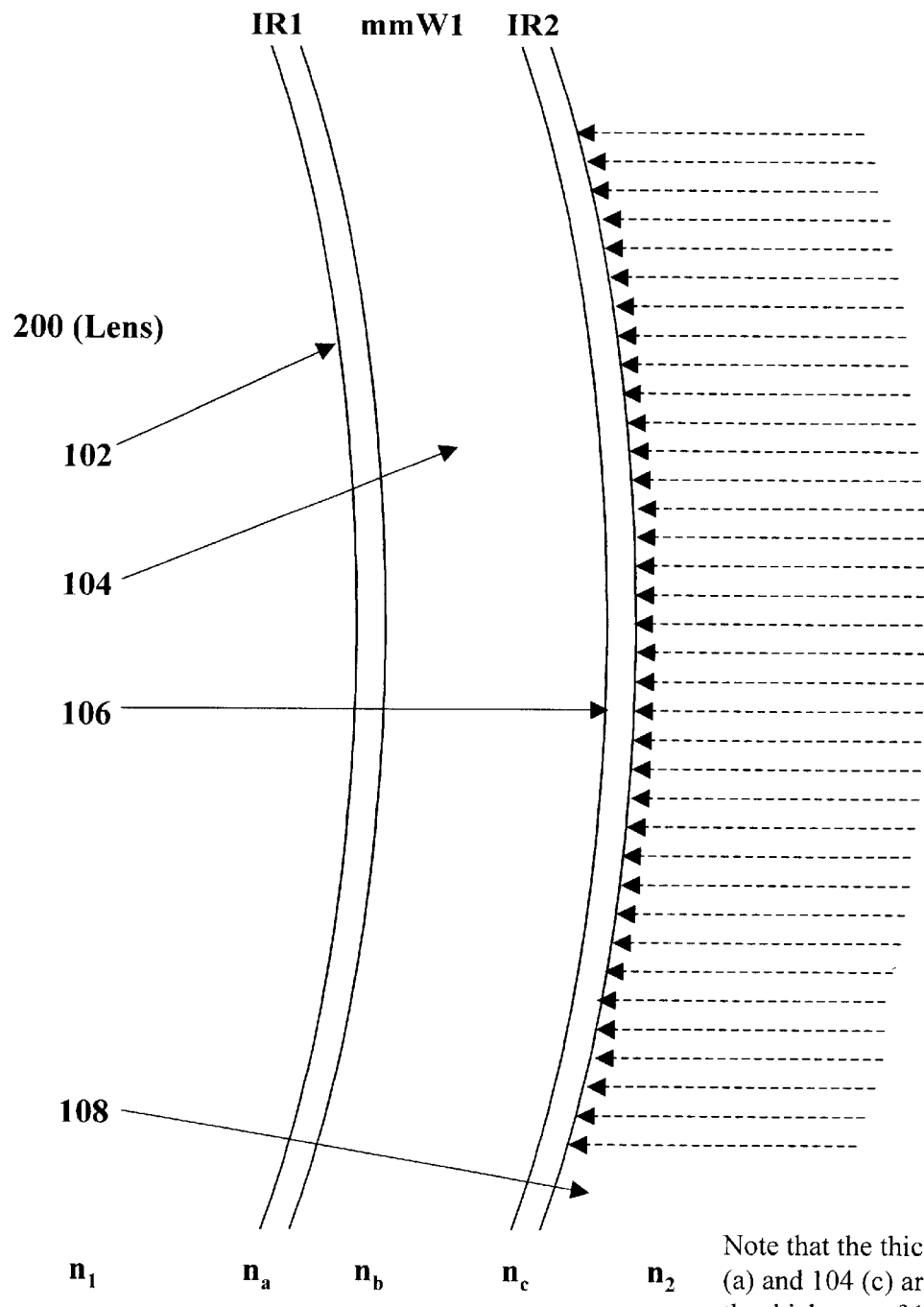
FIG. 2 presents a schematic view demonstrating the application of the dual band millimeter-wave and infrared coatings of the present invention to a lens substrate.

A schematic view of an embodiment demonstrating the application of the dual band, millimeter-wave and infrared, coatings of the present invention to a lens substrate is shown in FIG. 2. As illustrated, the radiation-receiving surface 100 of FIG. 1 is replaced by a radiation-receiving lens surface 200. The first infrared anti-reflecting layer 102, millimeter-wave anti-reflecting layer 104, and second infrared anti-reflecting layer 106 are all as described for FIG. 1.

In either of the embodiments, because thin, conformal coatings are used, the coating surfaces may be assumed parallel, and the index of refraction multiplied by angle of propagation (e.g. $n_a \sin[\theta_a]$) within each coating layer may be assumed to be the same at both surfaces. This represents an approximation, which is useful for the purpose of determining coating thickness, and which is generally a good approximation when the radius of curvature of the lens is large compared to the coating thickness. In the event that the specific design requires smaller radii, where the refraction of the layers may introduce distortion of the images, the design may be corrected, still using this coating thickness approximation on the axis and using conventional lens design techniques.

For thick lenses, it is assumed the design of the lens coating surfaces would be finalized using conventional multi-lens design techniques to correct refractive errors. In this event, the conformal coatings may end up slightly tapering from the lens center to the lens edge. This would also account for variations in angle of incidence across the lens aperture by varying the coating thickness somewhat. Because optimization for a particular use results in tradeoffs in features applicable to other uses, there is no general optimization scheme incorporating the lens requirements of all applications. However when designing a lens system the designer may choose to optimize the antireflective coating properties in one waveband over another, based of anticipated application. In optimizing the properties the thin lens, approximation provides a good starting point for analysis.

According to Snell's law, the quantity $n_a \sin[\theta_a]$ is constant along a given ray through the thin conformal coating, where $n_a$ is the index of refraction for the second anti-reflecting layer 106, and where $\theta_a$ represents the angle of incidence of the radiation into the second anti-reflecting layer 106. As a result, the coating does not significantly affect the angle of propagation of the radiation, and the ray at the surface between the radiation-receiving surface 100 (or the radiation-receiving lens surface 200) and the first infrared anti-reflecting layer 102 and the surface between the second infrared anti-reflecting layer 106 and the external medium 108 follow Snell's law as if they were the only surfaces present:

$$n_1 \sin[\theta_1] = n_a \sin[\theta_a],$$

where $\theta_1$ represents the angle of incidence of the radiation into the radiation-receiving surface 100 (or the radiation-receiving lens surface 200), and $\theta_a$ represents the angle of incidence of the radiation into the layer second infrared anti-reflecting layer 106.

The conventional approach to creating an anti-reflective coating involves the application of a ¼ wavelength coating of a material with an index of refraction that matches the square root of the product of the of the two indices:

$$n_{coating} = (n_1 n_2)^{1/2},$$

where $n_1$ and $n_2$ represent the indices of refraction for the media between which the coating is interposed (e.g. a substrate material for $n_1$ and air for $n_2$). It is not necessary for the index of refraction match to be perfect in order to gain a low reflectance. The functional form of reflectance of a quarter-wavelength coating is as follows:

$$R = \frac{(n_1 n_2 - n_{coating}^2)^2}{(n_1 n_2 + n_{coating}^2)^2};$$

where R represents the amount of radiation reflected from the surface, and $n_1$ and $n_2$ are as previously defined.

Figure 3:
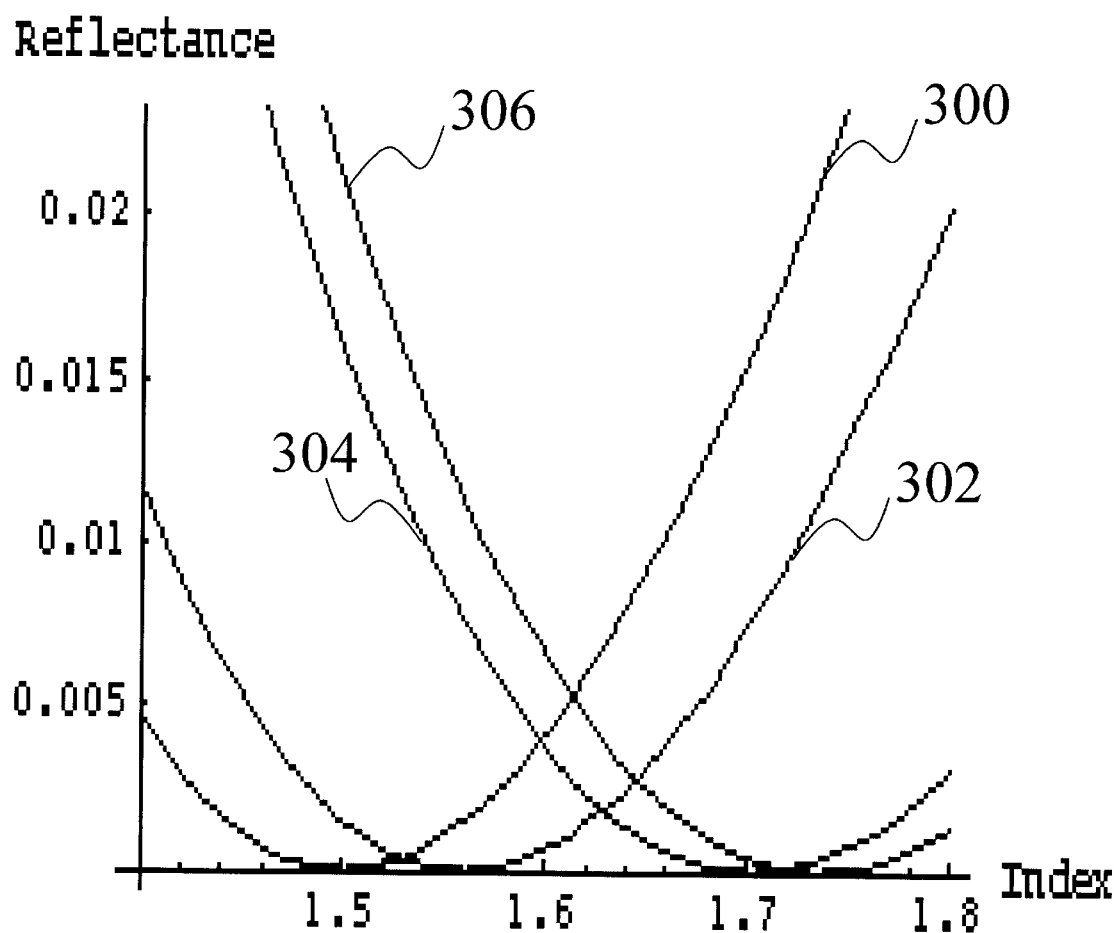
FIG. 3 presents a graph showing the reflectance, R, of ZnS and ZnSe surfaces in the millimeter-wave and infrared bands versus the coating index for a quarter wave coating.

A graph showing the reflectance, R, of ZnS and ZnSe surfaces in the millimeter-wave and infrared bands versus the coating index for a quarter wave coating is depicted in FIG. 3, showing specifically the reflectance of ZnSe in the infrared band 300, ZnS in the infrared band 302, ZnSe in the millimeter-wave band 304, and ZnS in the millimeter-wave band 306. As can be seen from the figure, a coating index, $n_{coating}$, in the range of 1.5 to 1.7 yields a reflective loss of less than 1.5%. As can be further seen from the figure, a coating index of 1.6 yields a reflective loss of less than 0.7% in either band with either material. Note that for each of the lens materials shown in FIG. 3, the second medium was considered to be air, with an index of refraction of 1.0.

The required coating thickness is assessed by considering where the angle of propagation, $\phi$, in the coating material will lead to an $n_{coating} d \cos[\phi] = \lambda/4$, where d is the material thickness, and where Snell's law determines $\phi$ in terms of the angle of incidence, i.e. $n_1 \sin[\theta_1] = n_{coating} \sin[\phi]$. This angle may vary across the surface of the coating depending on the shape of the radiation-receiving surface 100, and the overall effect will also depend on polarization. Because the variation in the angle of incidence at a given location is generally inconsequential, the material thickness d may be adjusted to be very close to the resonance minimum at one wavelength.

Two wavelengths are handled here with a two or three-layer anti-reflecting coating system. Because the ratio of wavelengths from millimeter-waves to infrared is so large, or widely spaced on the electromagnetic spectrum, (on the order of 1000:1), i.e. the quarter-wavelength coating designed for infrared will have little effect upon the propagation of the millimeter-waves. Likewise, the free-space coherence length of blackbody infrared is roughly the wavelength squared over the bandwidth, or a distance on the order of 10 µm. Because this distance is so much larger than the quarter-wavelength of approximately 500 µm in the millimeter-wave band, there will be no coherent coupling in the infrared across a millimeter-wave anti-reflecting coating. As shown in FIGS. 1 and 2, the millimeter-wave anti-reflecting layer 104 is much thicker than either the first infrared anti-reflecting layer 102 or the second infrared anti-reflecting layer 106, though this disparity is much greater in an actual embodiment.

The ideal matching conditions for the indices of refraction of the coating layers have been found to be:

$$n_a = n_2^{3/4} n_1^{1/4};$$

$$n_b = n_2^{1/2} n_1^{1/2}; \text{and}$$

$$n_c = n_2^{1/4} n_1^{3/4},$$

wherein all variables are as previously defined. Utilizing these equations, with example figures $n_2=1.0$ (representing air) and $n_1=2.4$ (representing the index of refraction of ZnSe in the infrared band), the optimum indices are found to be $n_a=1.24$, $n_b=1.55$, and $n_c=1.92$. Note that the indexes just given are those optimal for the particular band to which the particular coating layer applies (i.e. $n_a$ and $n_c$ in the infrared band and $n_b$ in the millimeter-wave band). It is important to note that some deviation from the optimal indices can lead to acceptable reductions in the overall losses from the surface even if the match is not ideal. Also, additional layers may be applied using thin film technology in order to tailor the coating structure to available low loss materials.

Several materials have been identified which may be applied for effective two-wavelength operation in the infrared and millimeter-wavebands. A table presenting a non-limiting list of typical coating materials along with their index of refraction and dielectric constant is depicted in FIG. 4. The materials presented include solids such as polymers, which can be easily cut and shaped; fluids, which may be used to fill voids; and hard coatings, which must formed by deposition or other suitable means. The particular material used for the coatings will depend on the details of the particular optical configuration. Because the thickness of the layer is relatively small, the loss tangent of the coating is less important than that of the thicker radiation-receiving surface 100 (or the radiation-receiving lens surface 200).

It is important to note that in the special case when laser radiation sources provide the incident infrared radiation it is possible to eliminate the need for the second infrared anti-reflecting layer 106 by making the millimeter-wave anti-reflecting layer 104 a quarter-wave thick in the millimeter-wave band, but $n/2+\frac{1}{4}\lambda$ wave thick in the infrared range.

What is claimed is:

1. A dual-band millimeter-wave and infrared anti-reflecting coating including:
   a. a first infrared anti-reflecting coating, said first infrared anti-reflecting coating having an optical thickness of approximately ¼ of the wavelength of a particular wavelength chosen from the infrared band;
   b. a millimeter-wave anti-reflecting coating disposed upon the first infrared anti-reflecting coating, said millimeter-wave anti-reflecting coating having an optical thickness of approximately ¼ of the wavelength of a particular wavelength chosen from the millimeter-wave band; and
   c. a second infrared anti-reflecting coating disposed upon the millimeter-wave anti-reflecting coating, said second infrared anti-reflecting coating having an optical thickness of approximately ¼ of the wavelength of a particular wavelength chosen from the infrared band.

2. A dual-band millimeter-wave and infrared anti-reflecting coating configured for simultaneous application in a plurality of wavebands as set forth in claim 1, wherein the first and third coatings are of substantially the same thickness and the second coating is approximately a thousand times thicker than either the first or third coating.

3. A dual-band millimeter-wave and infrared anti-reflecting coating configured for simultaneous application in a plurality of wavebands as set forth in claim 2, wherein the first infrared anti-reflecting coating has an index of refraction of about 1.9 in the infrared band, the millimeter-wave anti-reflecting coating has an index of refraction of about 1.6 in the millimeter-wave band, and the second infrared anti-reflecting coating has an index of refraction of 1.2 in the infrared band, and wherein the first anti-reflecting coating is disposed on a lens formed from ZnSe.

4. A dual-band millimeter-wave and infrared anti-reflecting coating configured for simultaneous application in a plurality of wavebands as set forth in claim 1 wherein the first anti-reflecting coating is disposed on a substrate.

5. A dual-band millimeter-wave and infrared anti-reflecting coating configured for simultaneous application in a plurality of wavebands as set forth in claim 4, wherein the substrate is a lens.

6. A dual-band millimeter-wave and infrared anti-reflecting coating configured for simultaneous application in a plurality of wavebands as set forth in claim 5, wherein the lens is formed from two materials selected from the group consisting essentially of ZnS, ZnSe, and $Al_2O_3$.

7. A dual-band millimeter-wave and infrared anti-reflecting coating including:
   a. a first infrared anti-reflecting coating, said first infrared anti-reflecting coating having an optical thickness of approximately ¼ of the wavelength of a particular wavelength chosen from the infrared band; and
   b. a millimeter-wave anti-reflecting coating disposed upon the first infrared anti-reflecting coating, said millimeter-wave anti-reflecting coating having an optical thickness of approximately ¼ of the wavelength of a particular wavelength chosen from the millimeter-wave band plus ½ the wavelength of the particular wavelength chosen from the infrared band.

8. A method for producing a dual-band millimeter-wave and infrared anti-reflecting coating including the steps of:
   a. providing a first infrared anti-reflecting coating, said first infrared anti-reflecting coating having an optical thickness of approximately ¼ of the wavelength of a particular wavelength chosen from the infrared band;
   b. providing a millimeter-wave anti-reflecting coating disposed upon the first infrared anti-reflecting coating, said millimeter-wave anti-reflecting coating having an optical thickness of approximately ¼ of the wavelength of a particular wavelength chosen from the millimeter-wave band; and
   c. providing a second infrared anti-reflecting coating disposed upon the millimeter-wave anti-reflecting coating, said second infrared anti-reflecting coating having an optical thickness of approximately ¼ of the wavelength of a particular wavelength chosen from the infrared band.

9. Use of a dual-band millimeter-wave and infrared anti-reflecting coating as produced by the method of claim 8.

10. A method for producing a dual-band millimeter-wave and infrared anti-reflecting coating as set forth in claim 8, further including the step of providing a substrate and disposing the first infrared anti-reflecting coating on the substrate.

11. A method for producing a dual-band millimeter-wave and infrared anti-reflecting coating as set forth in claim 10, wherein the substrate provided is a lens.

12. A method for producing a dual-band millimeter-wave and infrared anti-reflecting coating as set forth in claim 11, wherein the lens provided is formed of two materials selected from the group consisting essentially of ZnS, ZnSe, and $Al_2O_3$.

13. A method for producing a dual-band millimeter-wave and infrared anti-reflecting coating as set forth in claim 10, wherein lens provided is formed of ZnSe, and the first infrared anti-reflecting coating provided has an index of refraction of 1.9 in the infrared band, the millimeter-wave anti-reflecting coating provided has an index of refraction of 1.6 in the millimeter-wave band, and the second infrared anti-reflecting coating provided has an index of refraction of 1.2 in the infrared band.

14. A method for producing a dual-band millimeter-wave and infrared anti-reflecting coating including the steps of:
   a. providing a first infrared anti-reflecting coating, said first infrared anti-reflecting coating having an optical thickness of approximately ¼ of the wavelength of a particular wavelength chosen from the infrared band; and
   b. providing a millimeter-wave anti-reflecting coating disposed upon the first infrared anti-reflecting coating, said millimeter-wave anti-reflecting coating having an optical thickness of approximately ¼ of the wavelength of the particular wavelength chosen from the millimeter-wave band plus ½ of the wavelength of the particular wavelength chosen from the infrared band.

15. Use of a dual-band millimeter-wave and infrared anti-reflecting coating wherein said antireflective coating includes:

a. a first infrared anti-reflecting coating, said first infrared anti-reflecting coating having an optical thickness of approximately ¼ of the wavelength of a particular wavelength chosen from the infrared band;

b. a millimeter-wave anti-reflecting coating disposed upon the first infrared anti-reflecting coating, said millimeter-wave anti-reflecting coating having an optical thickness of approximately ¼ of the wavelength of a particular wavelength chosen from the millimeter-wave band; and c. a second infrared anti-reflecting coating disposed upon the millimeter-wave anti-reflecting coating, said second infrared anti-reflecting coating having an optical thickness of approximately ¼ of the wavelength of a particular wavelength chosen from the infrared band.

* * * * *